United States Patent
De Jong et al.

(10) Patent No.: US 10,343,384 B2
(45) Date of Patent: Jul. 9, 2019

(54) METHOD AND SYSTEM FOR APPLYING A FILM TO A PLASTIC WORK PIECE THAT IS TO BE CURED, AND A METHOD FOR PRODUCING A PLASTIC WORK PIECE

(71) Applicant: Airbus Operations GmbH, Hamburg (DE)

(72) Inventors: Claas De Jong, Hamburg (DE); Hendrik Palm, Hamburg (DE); Thomas Meyn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 363 days.

(21) Appl. No.: 14/704,380

(22) Filed: May 5, 2015

(65) Prior Publication Data

US 2015/0321458 A1 Nov. 12, 2015

(30) Foreign Application Priority Data

May 6, 2014 (DE) .......................... 10 2014 106 319

(51) Int. Cl.
*B32B 37/00* (2006.01)
*B32B 37/10* (2006.01)
*B29C 63/16* (2006.01)

(52) U.S. Cl.
CPC .......... *B32B 37/0076* (2013.01); *B29C 63/16* (2013.01); *B32B 37/1018* (2013.01); *B29C 2791/006* (2013.01); *B32B 2605/18* (2013.01)

(58) Field of Classification Search
CPC . B32B 37/0076; B32B 37/10; B32B 37/1018; B32B 2605/18; B29C 63/16; B29C 2791/006
(Continued)

(56) References Cited

U.S. PATENT DOCUMENTS 3,149,018 A * 9/1964 Jacobson ............... B29C 51/002
156/213
3,334,383 A 8/1967 Irvine
(Continued)

FOREIGN PATENT DOCUMENTS

DE 195 05 523 A1 8/1996
EP 330972 A2 9/1989
(Continued)

*Primary Examiner* — Michael N Orlando
*Assistant Examiner* — Christian Roldan
(74) *Attorney, Agent, or Firm* — Jenkins, Wilson, Taylor & Hunt, P.A.

(57) ABSTRACT

Method and system for applying film to a plastic work piece to be cured, including providing a plastic work piece disposed on a surface of a base member, a free region remaining around the plastic work piece, an application frame having a frame housing with a frame opening and a frame edge enclosing the frame opening, and a film suitable for covering a plastic work piece during the curing thereof. Film is applied on the frame edge where the film covers the frame opening, and a lip region of the film is fastened to the frame edge. The application frame can move relative to the plastic work piece, where the plastic work piece passes through the frame opening until the frame edge, the lip region fastened thereto, is placed on the free region, wherein the film is deformed by the plastic work piece and rests against the plastic work piece.

16 Claims, 2 Drawing Sheets

(58) Field of Classification Search
USPC .......................................................... 156/285
See application file for complete search history.

(56) References Cited

U.S. PATENT DOCUMENTS

| | | | | |
|---|---|---|---|---|
| 4,447,282 A | * | 5/1984 | Valerio | B27D 1/08 |
| | | | | 156/212 |
| 4,878,979 A | | 11/1989 | Steinbach | |
| 5,225,027 A | * | 7/1993 | Diekwisch | B29C 51/16 |
| | | | | 156/285 |
| 5,569,344 A | * | 10/1996 | Grimnes | B29C 70/08 |
| | | | | 156/90 |
| 6,723,272 B2 | | 4/2004 | Montague et al. | |
| 2012/0080142 A1 | * | 4/2012 | Kulik | B29C 33/405 |
| | | | | 156/213 |
| 2013/0309465 A1 | * | 11/2013 | Oda | B32B 7/02 |
| | | | | 428/212 |
| 2015/0321458 A1 | * | 11/2015 | De Jong | B32B 37/0076 |
| | | | | 156/285 |

FOREIGN PATENT DOCUMENTS

| | | | |
|---|---|---|---|
| EP | 1 721 733 A1 | 11/2006 | |
| EP | 2 942 182 B1 | 2/2017 | |
| FR | 2629010 A1 | 9/1989 | |
| GB | 2073648 * | 3/1981 | ............. B29C 17/06 |
| GB | 2073648 A | 10/1981 | |
| WO | WO 98/00275 A1 | 1/1998 | |

* cited by examiner

METHOD AND SYSTEM FOR APPLYING A FILM TO A PLASTIC WORK PIECE THAT IS TO BE CURED, AND A METHOD FOR PRODUCING A PLASTIC WORK PIECE

CROSS-REFERENCE TO RELATED APPLICATION

This application claims priority to German Patent Application No. 10 2014 106 319.8 filed May 6, 2014, the entire disclosure of which is incorporated by reference herein.

TECHNICAL FIELD

The present disclosure relates to a method for applying a film to a plastic work piece that is to be cured, in particular in an autoclave.

BACKGROUND

Further aspects of the disclosure herein relate to a method for producing a plastic work piece and a system for applying a film to a plastic work piece that is to be cured, in particular in an autoclave. An application of this kind is typically referred to as a transfer. As an alternative to curing in an autoclave, however, the film may also be provided for the curing of a plastic work piece in an oven or for curing in another manner.

The background of the present disclosure is the production of plastic work pieces or plastic components, in particular components made of carbon fiber reinforced plastic, which must be cured in an autoclave during production. In order to produce plastic work pieces of this kind, the plastic or a plastic fiber mixture must first be applied to a base member, which is referred to as a production device, in an uncured state. Before the as yet uncured plastic work piece, which has been applied to the base member, can be subjected to a specific pressure and a specific temperature for curing in an autoclave, the free surface, which is to say, the surface that does not fit against the base member, must first be overlaid with a film in order to protect and maintain the shape of the uncured plastic or, respectively, the free surface thereof during treatment in the autoclave, wherein the film separates the atmosphere that is within the film facing the plastic work piece from the atmosphere within the autoclave that is outside of the film facing away from the plastic work piece. If the film has been applied, the plastic work piece can be treated in the autoclave.

Different methods of applying the film to the plastic work piece are known from the prior art. According to one method, a plastically deformable film is applied to a plastic work piece in a thermoforming process, wherein the film is plastically deformed so that it fits tightly against the plastic work piece. Such a method is complex, however, since molding dies must be used therefor, which are associated with substantial expenses, such as for space, personnel and time, in particular in the case of large components such as are common in the field of aviation. In addition, the films, which are plastically deformed in a thermoforming process, cannot be used in re-use applications, which would be essentially desirable from an economic and ecological standpoint.

According to another method, a film is applied to a plastic work piece in that the film is cast or placed over the plastic work piece and subsequently sealed with respect to the base member, for example by clamping. In so doing, depending on the geometry of the plastic work piece, as a rule it is not possible to prevent the formation of wrinkles in the film with respect to the plastic work piece and with respect to the base member, which wrinkles must be individually sealed by hand in a time consuming manner. In addition, in this way, it is nearly impossible that the film will fit tightly and uniformly against all sides of the plastic work piece, which is also desirable.

SUMMARY

For this reason, an object of the present disclosure is to provide a method for applying a film to a plastic work piece that is to be cured in an autoclave, which method can be carried out in the least complex manner possible, and with which, the film fits against the surface of the plastic work piece and of the base member as smoothly and as tightly as possible, so that no subsequent manual sealing is needed.

This object is achieved by the method according to the disclosure herein.

An uncured plastic work piece is initially provided, which is to be cured in an autoclave, and which is disposed on the surface of a base member in such a way that a free region of the surface of the base member remains around the plastic work piece (step a). Uncured as set forth in the present disclosure means that the plastic work piece is at least not completely cured, and an additional treatment in the autoclave is planned. In the case of the plastic work piece, this is preferably a fiber composite work piece, for example, such as a work piece made of a carbon fiber reinforced plastic, which is preferably derived from the aircraft manufacturing sector, for example such as a wing or fuselage member of an aircraft structure. In the case of the base member, this is preferably what is referred to as a production device for receiving and, if applicable, shaping the plastic or, respectively, plastic-fiber core during the curing process. The free region of the surface of the base member is to be understood in such a way that this region is not covered by the plastic work piece.

In addition, an application frame, or a transfer frame, having a frame housing, is provided. The frame housing has a frame opening and a frame edge surrounding the frame opening, wherein the frame opening is dimensioned in such a way that the plastic work piece can be passed through the frame opening (Step b). For example, the frame housing may be formed as a tube, ring, or hollow body having an opening on one side.

In addition, a film is provided, which is suitable for covering a plastic work piece during the curing thereof in an autoclave (step c). The film is elastically deformable and preferably formed out of a plastic material. A film of this kind may be a thermoplastic elastomer film, for example. Within this context, elastically deformable is to be understood to mean that the film exhibits at least a significant percentage of elastic expansion in the event of an expansion. Such a significant percentage may be on the order of approximately 20%, preferably 35% of the total expansion. In concrete terms, the required percentage of elastic expansibility of the film is a function of the geometry of the plastic work piece. The higher the work piece extends, which is to say, the further away from the base member, the higher the percentage of plastic expansibility the film must exhibit. If the film is provided for reuse, the percentage of elastic expansibility must be high enough that the film is only deformed in the elastic region during the entire process of applying the film to the plastic work piece.

The film is subsequently applied to the frame edge in such a way that the frame opening is covered by the film. In so doing, the film is preferably pulled taught. Thereafter, a lip region of the film is affixed to the frame edge (step d). This fastening process may be done in various ways.

Finally, the application frame is moved with respect to the plastic work piece, e.g. is placed over the work piece, so that the plastic work piece is passed through the frame opening until the frame edge, having the lip region of the film affixed thereto, contacts the free region of the surface of the base member about the plastic work piece (step e). During this relative movement, the film is deformed, preferably in an elastic manner, by the plastic work piece, and is in contact therewith.

Using the method according to the disclosure herein, it is therefore possible to apply a film to a plastic work piece that is to be cured in an autoclave in a particularly simple and fast manner, wherein, because the film is elastically expanded during the application, the film fits tightly and uniformly against the plastic work piece or, respectively, on the surface thereof.

Because the film is deformed only in the elastic region during the application, the film can be reused under certain circumstances, even after removal from the plastic work piece, e.g. it can again be applied to the plastic work piece. In the case that the film is to be used multiple times, the film may be provided in such a way that treatment in the autoclave does not cause any essential changes in the structural properties thereof. In this case, a certain minimum thickness of the film is useful in order to largely avoid plastic deformations of the film, for example at the edges of the plastic work piece.

In a preferred embodiment, an adhesive bond is produced between the lip region of the film and the free region of the surface of the base member, which is contacted by the lip region. In this way, the plastic work piece is sealed by the film and the base member, which is connected to the film. This adhesive joint is preferably formed such that it is air-tight, so that the space under the film can be evacuated.

In so doing, it is particularly preferred when the adhesive joint is produced with the aid of an adhesive, for example, a strip of sealant, which is applied to the lip region of the film, before the lip region contacts the free region of the surface of the base member around the plastic work piece. In this way, a particularly simple and, at the same time, effective adhesive joint can be produced between the film and the base member. Alternatively, however, the adhesive may also be applied to the free region of the surface of the base member, on which the lip region of the film is positioned.

Alternatively, it is particularly preferred when the adhesive joint is produced with the aid of a vacuum between the lip region of the film and the free region of the surface of the base member, with which the lip region is in contact. A vacuum of this kind can be formed, for example by evacuating the space under the film. In addition, the lip region of the film may be formed in such a way that it can fit tightly against the surface of the base member and, in this way, can maintain the vacuum beneath the film. An adhesive joint that is produced with the aid of a vacuum has the advantage that no adhesive is needed.

According to a preferred embodiment, after the adhesive joint has been produced, the application frame is removed from the film. In this way, the application frame is available for use on an additional plastic component, and does not take up any unnecessary space in the autoclave.

According to a further preferred embodiment, after the frame edge, having the lip region of the film affixed thereto, has contacted the free region of the surface of the base member, the space between the film, the plastic work piece and the base member is evacuated. In this way, the space under the film, e.g. between the film and the plastic work piece, as well as between the film and the base member, is evacuated. As a result of a vacuum of this kind beneath the film, the film is forcedly pressed tightly against the surface of the plastic work piece, wherein the film is elastically deformed, and remains in this shape or, respectively, position for as long as the vacuum is maintained. Above all, due to the vacuum under the film, when the film is pressed onto the plastic work piece and onto the base member, the distribution and elastic deformation of the film eliminate wrinkles in the film, which otherwise would have to be eliminated or sealed by hand in a time consuming manner.

In so doing, it is particularly preferred when, in order to evacuate the space between the film, the plastic work piece and the base member in the base member, in particular in the region of the base member that is covered by the film, an evacuation port is provided, which connects the space between the film, the plastic work piece and the base member to the environment, and which can be connected to a vacuum pump. In so doing, the evacuation port may be designed as an opening or a bore in the base member, which is open to the space under the film on one side, and to a reverse side or lateral surface that is apart from the film on the other side, whereby, in order to create a vacuum, a connection is provided for a vacuum pump.

Alternatively, it is particularly preferred when, in order to evacuate the space between the film, the plastic work piece and the base member, before the frame edge, having the lip region of the film affixed thereto, contacts the free region of the surface of the base member, an evacuation port is inserted between the lip region of the film and the free region of the surface of the base member, which evacuation port connects the space between the film, the plastic work piece and the base member to the environment, and which can be connected to a vacuum pump. An evacuation port of this kind, which may be designed as a tube or hose, for example, is in particular suitable in cases in which the base member has not been provided with its own evacuation port. A tube of this kind may be affixed to the top of the film, which is pulled taught on the application frame, for example, so that an opening of the tube is located above the film, and another opening of the tube is located outside of the application frame. Thus, in this case the tube extends over the frame edge and away from any adhesive provided thereon.

According to a further embodiment, the lip region of the film is affixed to the frame edge with the aid of an adhesive, for example, such as a strip of sealant, with the aid of a vacuum between the lip region and the frame edge, with the aid of an electrostatic field, which is generated between the lip region and the frame edge, or with the aid of a mechanical fastener, e.g., clamping. All of these approaches are suitable for retaining the film during the relative movement of the application frame with respect to the plastic work piece or, respectively, the base member, wherein at the same time, the film can be released from the frame edge easily and without being destroyed.

According to yet another embodiment, the application frame is formed in such a way that the shape of the frame opening is adapted to the shape of the plastic work piece, wherein, when the plastic work piece is passed through the frame opening, a slight gap, having an essentially uniform width, is provided between the outer circumference of the plastic work piece and the frame edge. In this way, the film can be applied to the surface of the plastic work piece as directly and as precisely as possible, and the application frame need not be designed to be any larger than is absolutely necessary.

A further aspect of the disclosure herein relates to a method for producing a plastic work piece comprising:
application of a film to a plastic work piece using a method according to one of the above described embodiments and
curing of the plastic work piece, which is overlaid with a film, preferably in an autoclave.

The features, characteristics and advantages, which were described above in conjunction with the method for applying a film to a plastic work piece, correspond in an analogous manner to the features, characteristics and advantages of the method for producing a plastic work piece, and therefore are not repeated here.

A further aspect of the disclosure herein relates to a system for applying a film to a plastic work piece that is to be cured in an autoclave, the system having an application frame, a film and a base member.

The application frame has a frame housing having a frame opening and a frame edge surrounding the frame opening, wherein the frame opening is dimensioned in such a way that a plastic work piece, on which the film is to be applied, can be passed through the frame opening.

The film is suitable for covering a plastic work piece, on which the film is to be applied during the curing of the plastic work piece in an autoclave, wherein the film is designed such that it is elastically deformable.

The base member is adapted in such a way that a plastic work piece, on which the film is to be applied, is accommodated on the surface of the base member in such a way that a free region of the surface of the base member remains around the plastic work piece. An evacuation port is provided in the base member, which evacuation port connects the space in front of or, respectively, opposite the free region of the surface of the base member to a connection for a vacuum pump.

The system may be used to carry out the method for applying a film to a plastic work piece according to one of the embodiments described above. The features, characteristics and advantages described above in conjunction with the method correspond in an analogous manner to the features, characteristics and advantages of the system, and therefore are not repeated here.

BRIEF DESCRIPTION OF THE DRAWINGS

An embodiment of the disclosure herein is explained in greater detail on the basis of a drawing. The drawing shows in.

DETAILED DESCRIPTION

FIGS. 1 through 6 depict individual steps of an embodiment of the method according to the disclosure herein for applying a film 1 to a plastic work piece 3 that is to be cured in an autoclave. A method in accordance with this disclosure is described hereinbelow.

Figure 4:
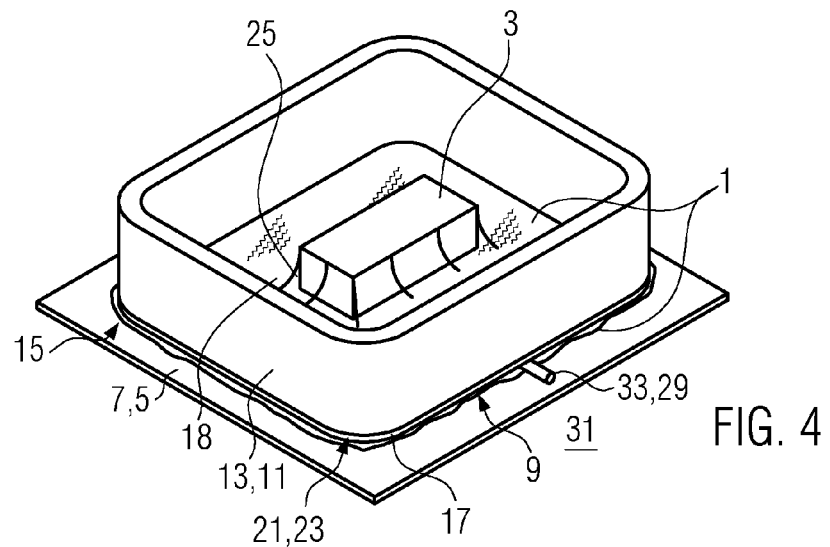
FIG. 4 a perspective view of the application frame from FIG. 3, wherein the application frame is placed over a plastic work piece, which is disposed on a base member, so that the film fits against the plastic work piece and an adhesive joint is produced between a lip region of the film and a free region of the surface of the base member.
Figure 5:
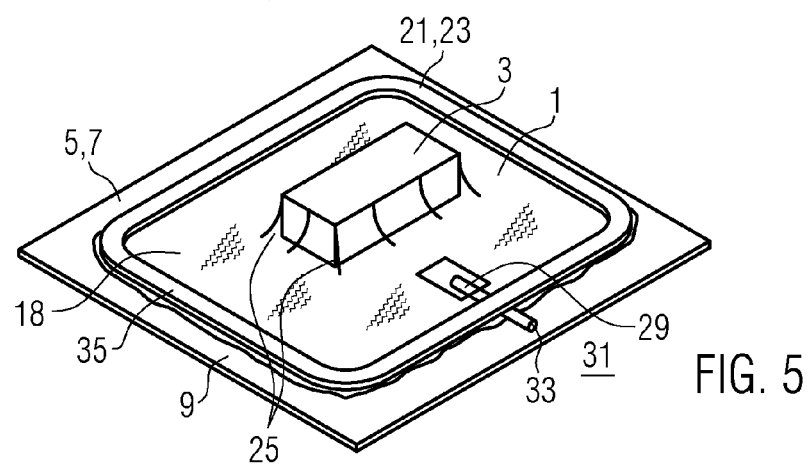
FIG. 5 a perspective view of the plastic work piece from FIG. 4, which is covered by a film, wherein the application frame has been removed from the film.
Figure 6:
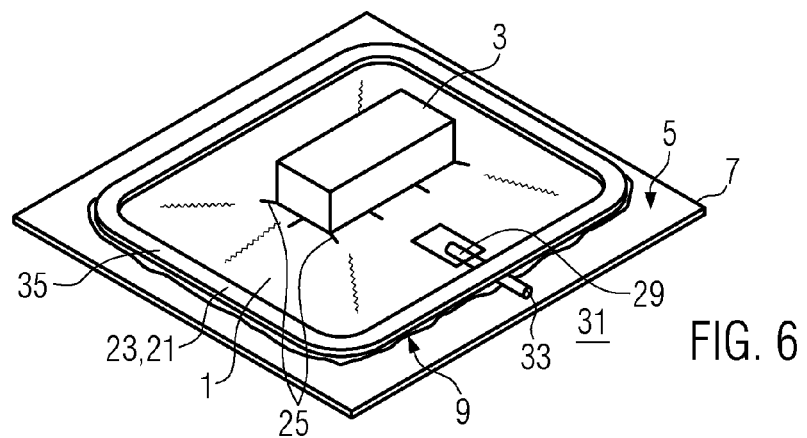
FIG. 6 a perspective view of the plastic work piece from FIG. 5, which is covered by a film, wherein the space between the film, the plastic work piece and the base member is evacuated.

An uncured plastic work piece 3, in the present embodiment a work piece made of carbon fiber reinforced plastic from the aircraft manufacturing sector, is initially provided as depicted in FIGS. 4 through 6, which work piece is to be cured in an autoclave. As can also be seen in FIGS. 4 through 6, this plastic work piece 3 is disposed on the surface 5 of a base member 7, which, in the present case, is a production device for the shaping of the plastic work piece 3, wherein a free region 9 of the surface 5 of the base member 7 remains around the plastic work piece 3, which is not covered by the plastic work piece 3.

Figure 1:
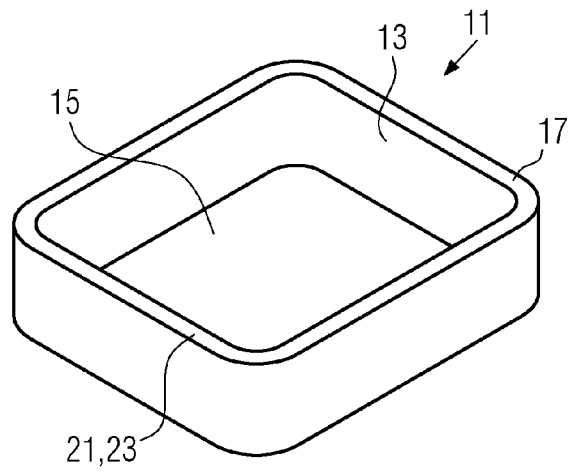
FIG. 1 a perspective view of an application frame for applying a film to a plastic work piece according to an embodiment of the method according to the disclosure herein.

Next, an application frame 11, as depicted in FIG. 1, is provided. The application frame 11 has a frame housing 13, which in the present case, has a tubular design or, respectively, an annular design, and which has a frame opening 15 as well as a frame edge 17 enclosing the frame opening 15. As can be seen in FIG. 4, the frame opening 15 is dimensioned in such a way that the plastic work piece 3 can be passed through the frame opening 15. In so doing, the frame opening 15 is adapted to the shape of the plastic work piece 3 in such a way that, when the plastic work piece 3 is passed through the frame opening 15, a slight gap 18, having an essentially uniform width, is provided between the outer circumference of the plastic work piece 3 and the frame edge 17.

Figure 2:
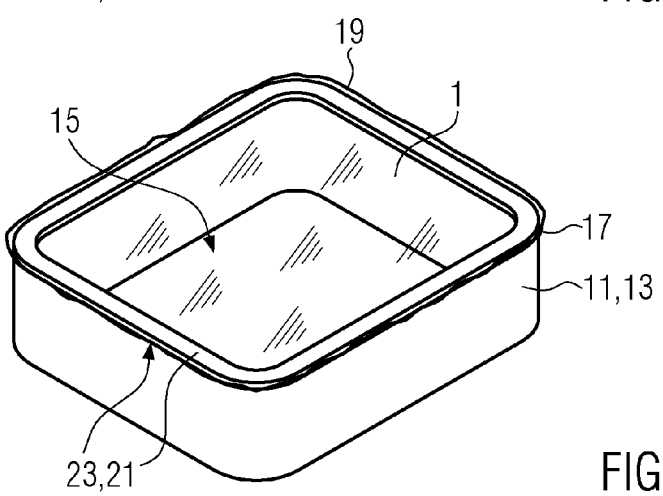
FIG. 2 a perspective view of the application frame from FIG. 1, wherein a film is affixed to the frame edge and covers the frame opening.

Finally, a film 1 is then provided, which is suitable for covering the plastic work piece 3 during the curing thereof in an autoclave, as shown in FIGS. 2 and 4, for example. The film 1 is designed such that it is elastically deformable, which is to say, in the case of a deformation up to a specific maximum deformation threshold, the film again assumes an initial shape after it is no longer loaded, without a further application of force.

As depicted in FIG. 2, the film 1 is now applied to the frame edge 17, so that the frame opening 15 is covered by the film 1. In so doing, the film 1 is pulled taught, so that it covers the frame opening 15 as smoothly as possible and without the formation of wrinkles. A lip region 19 of the film 1, which is to say, the region of the film 1, which fits against the frame edge 17, is now affixed to the frame edge 17 with the aid of an adhesive 21, in particular a strip of sealant 23, which has previously been applied to the frame edge 17. In order to affix the lip region 19 of the film 1 to the frame edge 17, instead of a strip of sealant 23, another adhesive 21, a vacuum created between the lip region 19 and the frame edge 17, an electrostatic field generated between the lip region 19 and the frame edge 17 or a mechanical fastener, for example such a as clamp, may be used. After the film 1 has been affixed to the frame edge 17, an adhesive 21, in the present case, a strip of sealant 23, is applied to the lip region 19 of the film 1 on the side facing away from the frame edge 17.

Figure 3:
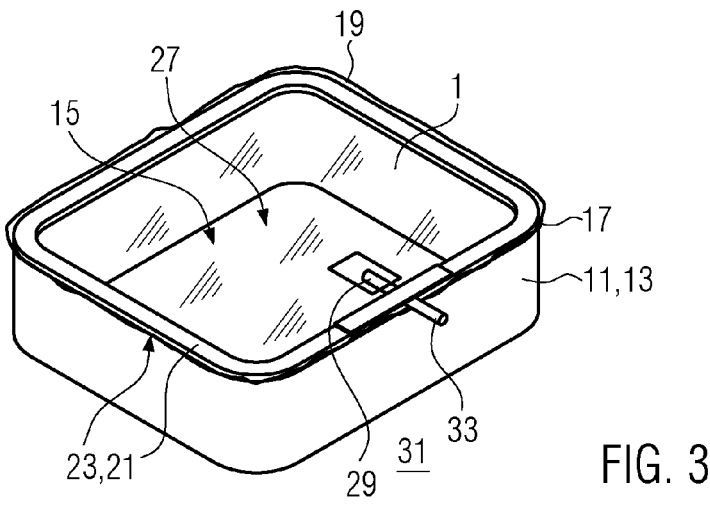
FIG. 3 a perspective view of the application frame from FIG. 2, wherein an evacuation port in the form of the tube has been affixed to the film.

As can be seen in FIG. 3, in order to evacuate the space 25 between the film 1, the plastic work piece 3 and the base member 7 then, which is to say, before the positioning of the frame edge 17, having the lip region 19 of the film 1 affixed thereto, on the free region 9 of the surface 5 of the base member 7, an evacuation port 29 in the form of a tube is affixed to the upper side 27 of the film 1, which is to say, in the present case, the port is glued to the film 1 and held between two strips of sealant 23 on the frame edge 17. The evacuation port 29 thus extends from the upper side 27 of the film 1 above the frame edge 17, so that, after the application of the film 1 onto the plastic work piece 3 or, respectively, the base member 7, this evacuation port is located between the lip region 19 of the film 1 and the free region 9 of the surface 5 of the base member 7 and thus, connects the space 25 between the film 1, the plastic work piece 3 and the base member 7 to the environment 31. After applying the film 1, a vacuum pump is connected to the end 33 of the evacuation port 29, which is exposed to the environment 31, in order to evacuate the space 25 beneath the film 1. Alternatively, the evacuation port 29 may also be provided in the base member 7 in such a way that the evacuation port connects the space 25 between the film 1, the plastic work piece 3 and the base member 7 to the environment 31, or, respectively, to a vacuum pump.

As is shown in FIG. 4, the application frame 11 is finally moved with respect to plastic work piece 3, which is to say, in the present case, the application frame is placed over the work piece. In so doing, the plastic work piece 3 is passed through the frame opening 15, until the frame edge 17, having the lip region 19 of the film 1 affixed thereto, is positioned on the free region 9 of the surface 5 of the base member 7 about the plastic work piece 3. During this relative movement, the film 1 is elastically deformed by the plastic work piece 3 and is in contact therewith.

After the positioning of the frame edge 17 or, respectively, of the lip region 19 of the film 1, having the strip of sealant 23 affixed thereto, on the free region 9 of the surface 5 of the base member 7, an adhesive joint 35 is produced between the lip region 19 of the film 1 and the free region 9 of the surface 5 of the base member 7 by the strip of sealant 23, which is applied to the lip region 19 of the film 1. An air-tight adhesive joint 35 can be produced using a strip of sealant 23 of this kind, which joint is needed in order to be able to evacuate the space 25 under the film 1. Alternatively however, insofar as the film 1 is suited to this purpose, an adhesive joint 35 of this kind may also be produced solely by the vacuum, which is to say, the vacuum under the film 1.

After the adhesive joint 35 has been produced between the lip region 19 of the film 1 and the free region 9 of the surface 5 of the base member 7, the application frame 11 is removed from the film 1, as is depicted in FIG. 5, wherein the plastic work piece 3, which is affixed to the base member 7 and overlaid with film 1, remains for further treatment.

In order to fit the film 1 even more tightly against the plastic work piece 3 and the base member 7 and, in this way, in order to remove all wrinkles in the film 1 and also increase the adhesive force between the film 1 and the plastic work piece 3 or, respectively, the base member 7, in the following, the space 25 between the film 1, the plastic work piece 3 and the base member 7 is evacuated. This evacuation takes place via the evacuation port 29, for example by connecting the port to a vacuum pump.

Once the evacuation of the space 25 between the film 1, the plastic work piece 3 and the base member 7 has been completed and the evacuation port 29 has been sealed in order to maintain the vacuum, the plastic work piece 3, which is affixed to the base member 7 and overlaid with film 1, is placed in an autoclave for a curing treatment, in order to finally obtain a cured plastic work piece 3.

A system 37 according to the disclosure herein for applying a film 1 to a plastic work piece 3 that is to be cured in an autoclave can be formed by an application frame 11, a film 1 and a base member 7, as these have been described above in conjunction with the method. The application frame 11 has a frame housing 13 having a frame opening 15 and a frame edge 17 enclosing the frame opening 15, wherein the frame opening 15 is dimensioned in such a way that a plastic work piece 3, on which the film 1 is to be applied, can be passed through the frame opening 15. The film 1 is suitable for covering a plastic work piece 3, on which the film 1 is to be applied, during the curing of the plastic work piece 3 in an autoclave, wherein the film 1 is formed such that it is elastically deformable. The base member 7 is adapted in such a way that a plastic work piece 3, on which the film 1 is to be applied, is accommodated on the surface 5 of the base member in such a way that a free region 9 of the surface 5 of the base member 7 remains around the plastic work piece 3. An evacuation port 29 is provided in the base member 7, which port connects the space 25 in front of or, respectively, across from the free region 9 of the surface 5 of the base member 7 to a connection for a vacuum pump.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for applying a film to an uncured fiber reinforced plastic work piece that is to be cured in an autoclave or in an oven, the method comprising:
   providing the uncured fiber reinforced plastic work piece, which is disposed on a surface of a base member such that a free region of the surface of the base member remains around the fiber reinforced plastic work piece;
   providing an application frame comprising a frame housing with a frame opening and a frame edge surrounding the frame opening, wherein the frame opening is dimensioned such that the fiber reinforced plastic work piece can pass through the frame opening;
   providing a film suitable for covering the fiber reinforced plastic work piece during a curing thereof;
   applying the film on the frame edge so that the frame opening is covered by the film;
   fastening a lip region of the film to the frame edge;
   moving the application frame relative to the fiber reinforced plastic work piece so that the fiber reinforced plastic work piece passes through the frame opening until the frame edge, which has the lip region of the film attached thereto, contacts the free region of the surface of the base member around the fiber reinforced plastic work piece such that the lip region of the film is sandwiched between the surface of the base member and the frame edge;

providing an evacuation port in the base member, which connects a space between the film, the fiber reinforced plastic work piece, and the base member to the environment, and which is connectable to a vacuum pump; and evacuating, after the frame edge, which has the lip region of the film affixed thereto, contacts the free region of the surface of the base member the space between the film, the fiber reinforced plastic work piece, and the base member, wherein, while the application frame is moving relative to the fiber reinforced plastic work piece, the film is deformed by the fiber reinforced plastic work piece and rests against the fiber reinforced plastic work piece.

2. The method according to claim 1, comprising producing an adhesive joint between the lip region of the film and the free region of the surface of the base member, which is contacted by the lip region.

3. The method according to claim 2, wherein producing the adhesive joint comprises using an adhesive applied to the lip region of the film before the lip region contacts the free region of the surface of the base member around the fiber reinforced plastic work piece.

4. The method according to claim 2, wherein producing the adhesive joint comprises using a vacuum between the lip region of the film and the free region of the surface of the base member, with which the lip region is in contact.

5. The method according to claim 2, comprising removing the application frame from the film after the adhesive joint is produced.

6. The method according to claim 1, wherein the lip region of the film is affixed to the frame edge using an adhesive, a vacuum between the lip region and the frame edge, an electrostatic field, which is generated between the lip region and the frame edge, or a mechanical fastener.

7. The method according to claim 1, wherein the application frame is formed in such a way that the frame opening is adapted to a shape of the fiber reinforced plastic work piece, wherein a gap is provided when the fiber reinforced plastic work piece is passed through the frame opening, between an outer circumference of the fiber reinforced plastic work piece and the frame edge.

8. A method for producing a fiber reinforced plastic work piece, the method comprising:
applying a film to a fiber reinforced plastic work piece according to claim 1; and
curing the fiber reinforced plastic work piece, which is overlaid with film.

9. A method for applying a film to an uncured fiber reinforced plastic work piece that is to be cured in an autoclave or in an oven, the method comprising:
providing the uncured fiber reinforced plastic work piece, which is disposed on a surface of a base member such that a free region of the surface of the base member remains around the fiber reinforced plastic work piece;
providing an application frame comprising a frame housing with a frame opening and a frame edge surrounding the frame opening, wherein the frame opening is dimensioned such that the fiber reinforced plastic work piece can pass through the frame opening;
providing a film suitable for covering the fiber reinforced plastic work piece during a curing thereof;

applying the film on the frame edge so that the frame opening is covered by the film;

fastening a lip region of the film to the frame edge;

moving the application frame relative to the fiber reinforced plastic work piece so that the fiber reinforced plastic work piece passes through the frame opening until the frame edge, which has the lip region of the film attached thereto, contacts the free region of the surface of the base member around the fiber reinforced plastic work piece such that the lip region of the film is sandwiched between the surface of the base member and the frame edge;

inserting, before the frame edge, which has the lip region of the film affixed thereto, contacts the free region of the surface of the base member, an evacuation port between the lip region of the film and the free region of the surface of the base member, which connects a space between the film, the fiber reinforced plastic work piece, and the base member to the environment, and which is connectable to a vacuum pump; and evacuating, after the frame edge, which has the lip region of the film affixed thereto, contacts the free region of the surface of the base member the space between the film, the fiber reinforced plastic work piece, and the base member;

wherein, while the application frame is moving relative to the fiber reinforced plastic work piece, the film is deformed by the fiber reinforced plastic work piece and rests against the fiber reinforced plastic work piece.

10. The method according to claim 9, comprising producing an adhesive joint between the lip region of the film and the free region of the surface of the base member, which is contacted by the lip region.

11. The method according to claim 10, wherein producing the adhesive joint comprises using an adhesive applied to the lip region of the film before the lip region contacts the free region of the surface of the base member around the fiber reinforced plastic work piece.

12. The method according to claim 10, wherein producing the adhesive joint comprises using a vacuum between the lip region of the film and the free region of the surface of the base member, with which the lip region is in contact.

13. The method according to claim 10, comprising removing the application frame from the film after the adhesive joint is produced.

14. The method according to claim 9, wherein the lip region of the film is affixed to the frame edge using an adhesive, a vacuum between the lip region and the frame edge, an electrostatic field, which is generated between the lip region and the frame edge, or a mechanical fastener.

15. The method according to claim 9, wherein the application frame is formed in such a way that the frame opening is adapted to a shape of the fiber reinforced plastic work piece, wherein a gap is provided when the fiber reinforced plastic work piece is passed through the frame opening, between an outer circumference of the fiber reinforced plastic work piece and the frame edge.

16. A method for producing a fiber reinforced plastic work piece, the method comprising:
applying a film to a fiber reinforced plastic work piece according to claim 9; and
curing the fiber reinforced plastic work piece, which is overlaid with film.

* * * * *